United States Patent [19]

Lin

[11] Patent Number: 5,568,991

[45] Date of Patent: Oct. 29, 1996

[54] SEAT POST ASSEMBLY FOR BICYCLES

[76] Inventor: Wen-Hwa Lin, No. 5, Ming Shen Rd., Ta Chia Chen, Taichung Hsien, Taiwan

[21] Appl. No.: 522,493

[22] Filed: Aug. 31, 1995

[51] Int. Cl.[6] ................................................. F16B 23/00
[52] U.S. Cl. ............................ 403/24; 403/320; 403/343; 297/195.1; 297/188.09
[58] Field of Search ........................... 403/24, 299, 362, 403/320, 343; 224/31, 32 R, 275; 297/195.1, 188.09, 188.12; 280/281.1, 287, 288.3, 288.4, 201; 74/551.1–551.8

[56] References Cited

U.S. PATENT DOCUMENTS

| 5,016,894 | 5/1991 | Alioto | 280/201 |
|---|---|---|---|
| 5,035,440 | 7/1991 | Chappell | 280/288.4 X |
| 5,156,031 | 10/1992 | Gaul | 280/288.4 X |
| 5,172,607 | 12/1992 | Wu | 403/299 X |
| 5,242,184 | 9/1993 | Nicholls | 280/287 X |
| 5,351,980 | 10/1994 | Huang | 280/287 X |
| 5,397,094 | 3/1995 | Aoyama et al. | 280/281.1 X |

FOREIGN PATENT DOCUMENTS

| 528069 | 2/1993 | European Pat. Off. | 280/287 |
|---|---|---|---|
| 348597 | 5/1937 | Italy | 280/287 |
| 426922 | 11/1947 | Italy | 280/287 |

*Primary Examiner*—Kenneth J. Dorner
*Assistant Examiner*—Harry C. Kim
*Attorney, Agent, or Firm*—Varndell Legal Group

[57] ABSTRACT

A seat post assembly for bicycles includes a seat post made from a hollow tube having a close top end and an open bottom end, the open bottom end of the seat post having an inner thread, an inner tube mounted inside the seat post for storing things, the inner tube having an inner thread at a bottom end thereof, and a stepped screw cap threaded into the inner thread of the seat post and the inner thread of the inner tube to hold the inner tube inside the seat post.

3 Claims, 3 Drawing Sheets

SEAT POST ASSEMBLY FOR BICYCLES

BACKGROUND AND SUMMARY OF THE INVENTION

The present invention relates to seat posts for bicycles, and relates more particularly to such a seat post which has an inner tube for storing tools and accessories.

Regular bicycles do not have storage means for storing tools and accessories. However, various hand tools shall be used when to repair a bicycle. Therefore, bicycle riders usually will prepare some hand tools and put them in a bag for carrying on the bicycle. Some bicycle riders may directly insert hand tools in gaps in the frame of the saddle, However, hand tools tend to be shaken out of the frame of the saddle when the bicycle moves over an uneven road, The present invention has been accomplished under the circumstances in view. It is one object of the present invention to provide a seat post assembly for bicycles which has an inner tube for storing tools and accessories. It is another object of the present invention to provide a stepped screw cap for fastening the inner tube inside the seat post which has a pivoted handle for turning by hand.

DETAILED DESCRIPTION OF THE PREFERRED EMBODIMENT

Figure 1:
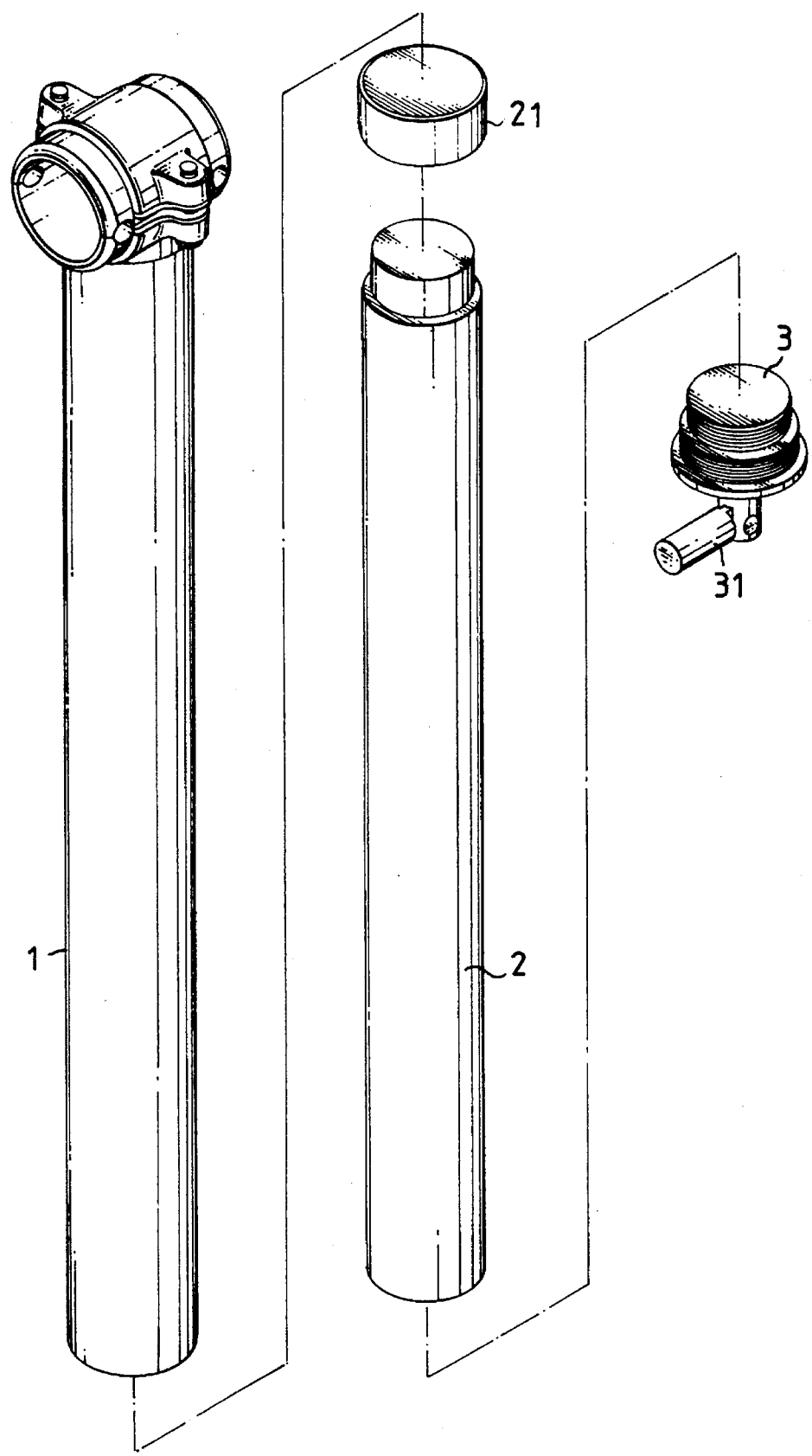
FIG. 1 is an exploded view of a seat post assembly according to the present invention.
Figure 2:
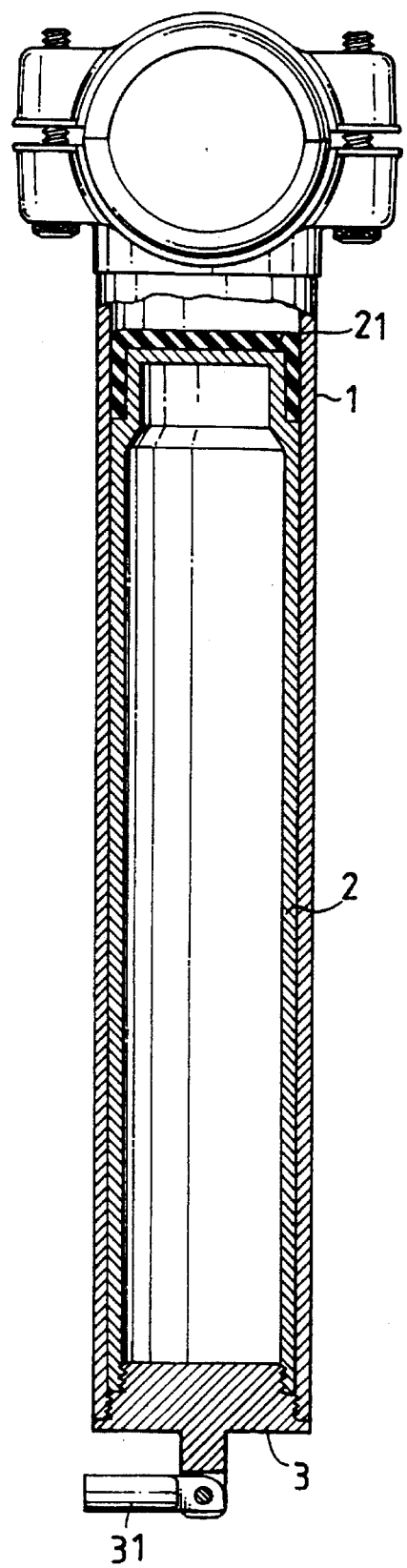
FIG. 2 is a sectional assembly view of the seat post assembly shown in FIG. 1.

Referring to FIGS. 1 and 2, the seat post, referenced by 1, is a hollow tube having one end (the top end) closed and an opposite end (the bottom end) opened. The inner diameter of the seat tube 1 gradually reduces toward the top close end. A rubber cap 21 is mounted inside the seat tube 1 at the top. An inner tube 2 is inserted into the seat post 1, having a top end fitted into the rubber cap 21, and a bottom end spaced from the bottom end of the seat post at a distance (see FIG. 2). The bottom ends of the seat post 1 and the inner tube 2 are respectively internally threaded. A stepped screw cap 3 is threaded into the internally threaded bottom ends of the seat post 1 and the inner tube 2, having a pivoted handle 31 for turning by hand.

Figure 3:
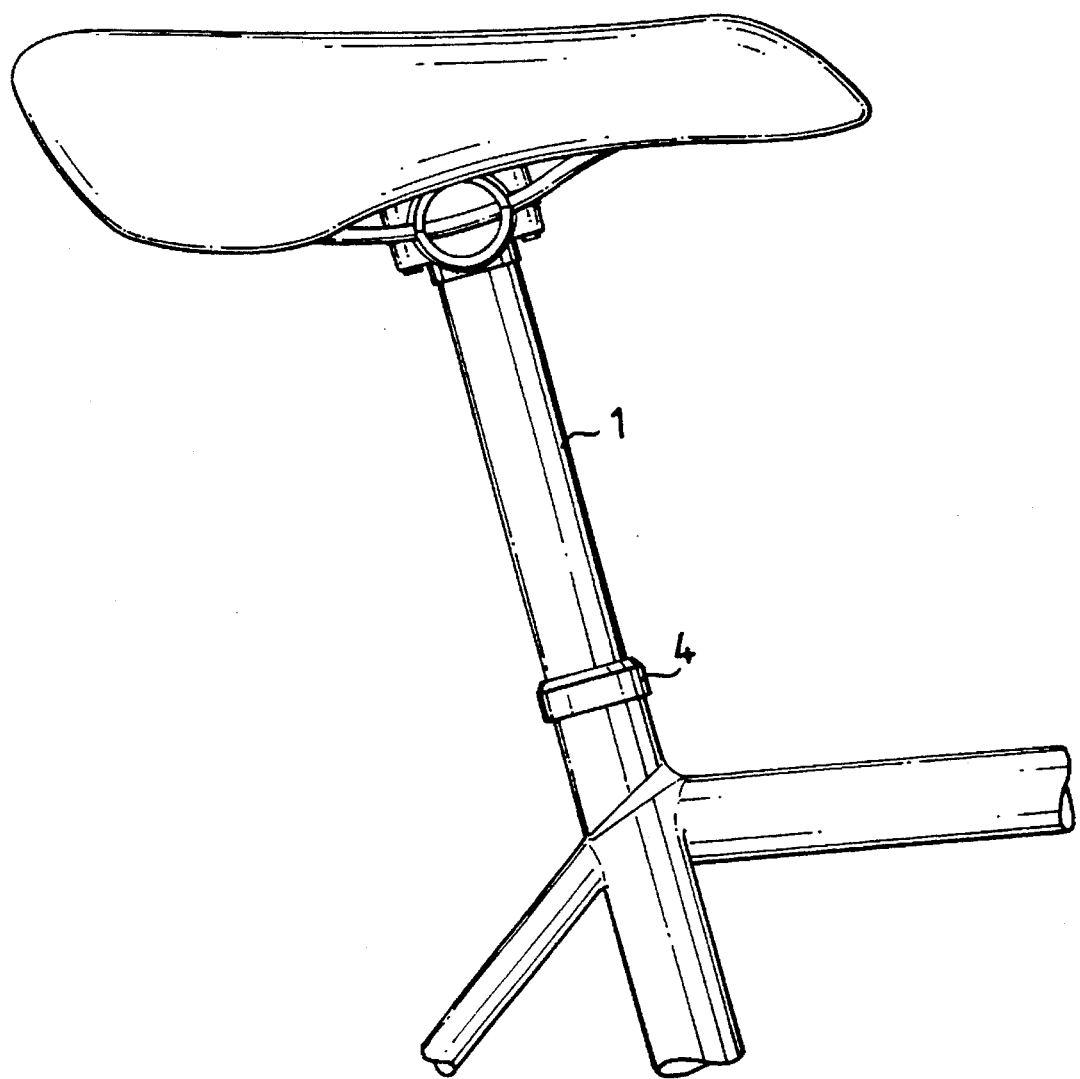
FIG. 3 is an applied view showing the seat post assembly installed in the seat tube of a bicycle.

The seat post assembly of the aforesaid structure is suitable for fastening to the seat tube of a bicycle which is equipped with a quick lock. As illustrated in FIG. 3, the seat post 1 is fastened to the seat tube of a bicycle and locked by a quick lock 4 to support a saddle. The inner tube 2 can also be used as a storage means for storing tools and accessories.

I claim:

1. A bicycle seat post assembly comprising a seat post made from a hollow tube having a closed top end and an open bottom end, the open bottom end of said seat post having an inner thread, an inner tube mounted inside said seat post for storing tools, said inner tube having an inner thread at a bottom end thereof, and a stepped screw cap threaded into the inner thread of said seat post and the inner thread of said inner tube to hold said inner tube inside said seat post.

2. The seat post assembly of claim 1 wherein an inner diameter of said seat post gradually reduce toward the closed top end; a rubber cap is mount inside the seat post adjacent to the closed top end to hold said inner tube inside said seat post.

3. The seat post assembly of claim 1 wherein said stepped screw cap has a pivoted handle on the outside for turning by hand.

* * * * *